United States Patent Office 2,919,976
Patented Jan. 5, 1960

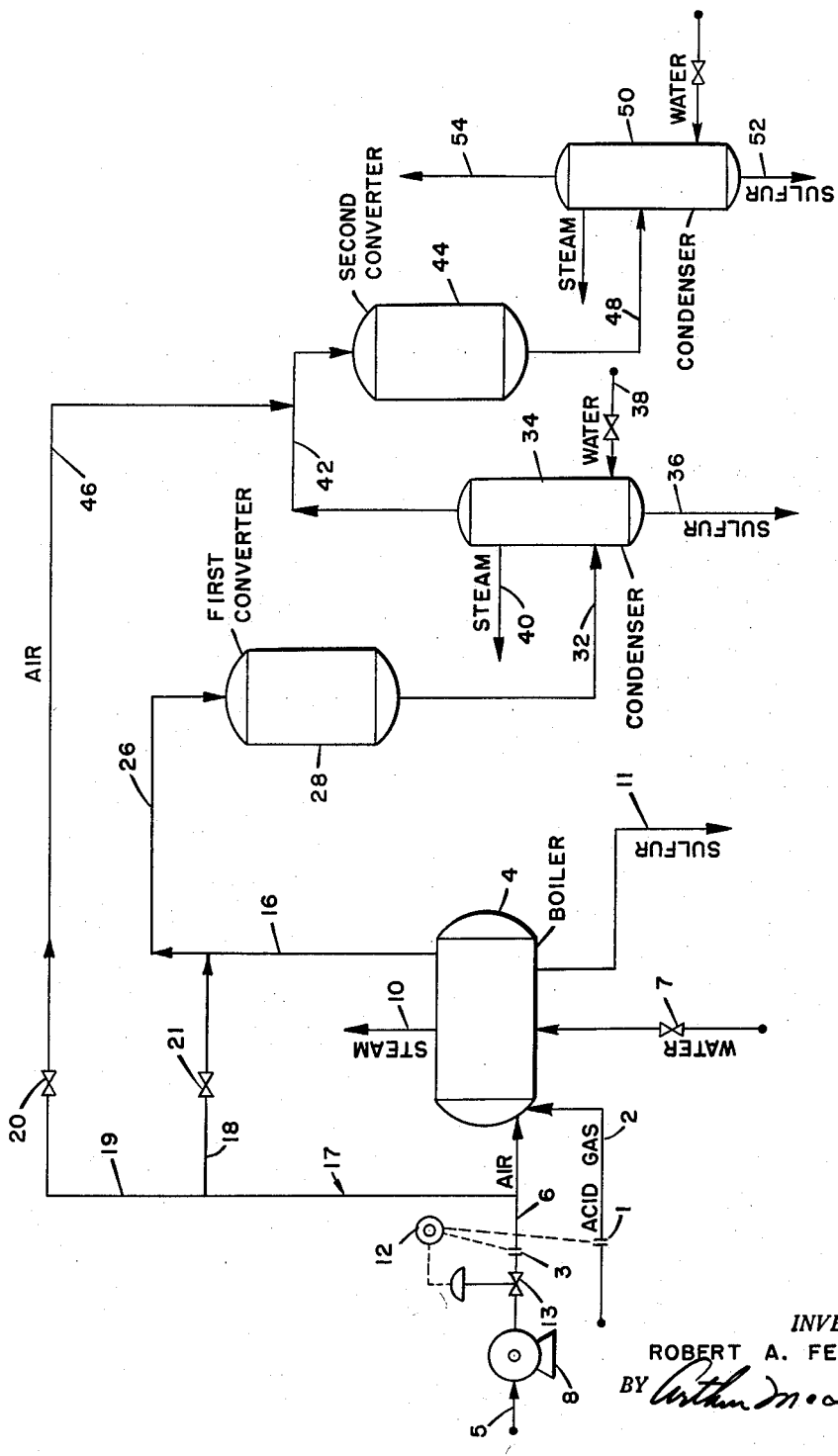

2,919,976
CONVERSION OF HYDROGEN SULFIDE INTO FREE SULFUR

Robert A. Feagan, Jr., Tulsa, Okla., assignor to Pan American Petroleum Corporation, a corporation of Delaware Application June 8, 1956, Serial No. 590,208

2 Claims. (Cl. 23—225)

The present invention relates to the recovery of elemental sulfur from hydrogen sulfide-containing gases involving the reaction of hydrogen sulfide with sulfur dioxide to give free sulfur and water. More particularly, it pertains to a novel method for controlling the temperature employed in effecting such reaction.

In the recovery of sulfur on a commercial scale from hydrogen sulfide-containing gases such as, for example, various industrial waste gases, refinery gases and sour natural gas, the hydrogen sulfide is usually first separated from the nonacid components by means of an ethanolamine scrubbing operation in a known manner. Depending upon the efficiency of the scrubbing step the concentration of the acidic components of the gas thus obtained may range from about 95 to about 99 percent. The sulfur recovery plants currently in operation which use such hydrogen sulfide-containing streams depend upon the reactions:

(1) $\quad H_2S + 3/2 O_2 \rightleftharpoons SO_2 + H_2O$
(2) $\quad 2H_2S + SO_2 \rightleftharpoons 3S + 2H_2O$
(3) $\quad H_2S + 1/2 O_2 \rightleftharpoons S + H_2O$ In some of these commercial operations all of the feed gas is introduced into a furnace together with sufficient air or other suitable source of free oxygen to oxidize one-third of the hydrogen sulfide in the feed to sulfur dioxide in accordance with Equation 1 above. Under the conditions employed, however, a minor portion of the sulfur dioxide formed reacts with some of the unconverted hydrogen sulfide to produce free sulfur in accordance with Equation 2. Also, as indicated in Equation 3 some hydrogen sulfide may be directly oxidized to elemental sulfur. Thus, in the product gas from the furnace, sulfur vapors are found in addition to sulfur dioxide and hydrogen sulfide. This gas is then usually run through a suitable waste heat boiler and cooled to the proper temperature for introduction into a catalytic converter where sulfur dioxide and hydrogen sulfide react to produce free sulfur. For a given fixed cooling surface in the furnace or in the waste heat boiler, when flow rates and hydrogen sulfide content of the feed are within the designed values, very little, if any, difficulty is encountered in the operation of the converter. However, a reduction in either flow rates or hydrogen sulfide content of the gas can result in a converter temperature sufficiently low to decrease materially the formation of free sulfur therein. The decrease in conversion of hydrogen sulfide to free sulfur at this stage of the process can result from either or both of two causes:

(1) The catalyst may become partially inactivated owing to gradual build-up of free sulfur deposited thereon from the furnace product gas;

(2) Reaction rate is reduced by reduction of temperature, and equilibrium is not attained in the converter.

Similar difficulties in regard to preventing intolerable reduction of converter temperatures are also experienced in other industrial methods for producing sulfur from hydrogen sulfide-containing gases. This is true, for example, in the case of procedures involving dividing the feed gas by burning one-third of it completely to sulfur dioxide and water and thereafter combining the sulfur dioxide thus produced with the remaining two-thirds of the original feed gas to give a mixture roughly equivalent to that produced when all of the feed gas is introduced into a furnace as referred to above.

With either of the above mentioned methods, difficulties in maintaining proper converter temperatures have been experienced. Efforts to overcome such a temperature control problem have involved by-passing a portion of the hot furnace effluent around the waste heat boiler and injecting said portion directly into the converter. Also, efforts have been made to control converter temperatures by employing heaters in the flow line just ahead of the converter. Such heaters burn either hydrogen sulfide or fuel gas. However, the presence of sulfur vapor from the by-pass system as mentioned above or diluents introduced in a fuel gas heater tend to reduce conversion. Also, the cost of either by-pass or heater equipment in plants of this kind is very substantial.

Accordingly, it is an object of my invention to overcome the above and other disadvantages existing in previous methods employed to regulate the catalyst temperature of the aforesaid converters. It is another object of my invention to improve control of reaction temperatures at lower temperature levels. It is a further object of my invention to provide a method whereby the deposition of free sulfur on the converter catalyst is avoided. Another object of my invention, particularly as applied to the method in which all of the feed gas is passed through the furnace, is the use of lower furnace effluent temperatures thus making possible the direct removal of more product sulfur from the furnace. It is another object of my invention to avoid the introduction of diluents and water produced in fuel gas fired heaters into the converter system.

Broadly, my invention involves the injection of a controlled amount of the air, required by the overall process, at the inlet end of one or more converters employed. The addition of air at this stage of the process generates sufficient heat by the reaction between hydrogen sulfide and oxygen to maintain the desired reaction temperature within the converter for maximum recovery, thereby eliminating the need for heaters, by-pass systems or other similar mechanical apparatus.

Whether the particular method employed involves injection of all of the feed gas through the furnace or passing only one-third of the gas therethrough, the overall quantity of oxygen supplied to the system will, of course, be the same, i.e. the stoichiometric amount required to convert hydrogen sulfide to free sulfur via the method indicated by the Equations 1 and 2 shown above.

In the actual operation of a commercial plant for the recovery of sulfur from hydrogen sulfide-containing gases, a ratio controller is employed to maintain the proper molar ratio of hydrogen sulfide and oxygen in the feed. Variations in hydrogen sulfide concentration in the feed gas tend to alter this balance; however, such condition is readily corrected by means of continuous or periodic analysis of the stack or vent gases issuing from the system. The process, to operate satisfactorily, discharges the small amount of unreacted hydrogen sulfide and sulfur dioxide in a molar ratio of about 2:1. When this ratio is either more or less than the aforesaid value, the air-hydrogen sulfide ratio controller is reset either manually or automatically to increase or decrease the air-hydrogen sulfide ratio, whichever is required to bring the stack gas molar ratio of hydrogen sulfide and oxygen back to the desired value of 2:1.

Reference to the accompanying drawing will serve to further illustrate the process of my invention. Thus, in the drawing a flow diagram is shown in which all of the aforesaid gas in line 2 is passed into boiler 4. Air in an amount less than that required to convert one-third of the hydrogen sulfide to sulfur dioxide in the boiler is injected through lines 5 and 6 by means of blower 8. The air supplied to the process is automatically controlled in a fixed ratio of acid gas to air by a flow ratio recorder controller 12 actuated by orifice meters 1 and 3. The quantity of air compressed by the blower is controlled either by regulating the blower speed or by control valve 13. The majority of air to the process flows through line 6 to the boiler; however, a small quantity which is used to increase converter inlet temperatures flows through lines 17, 18, 19 and 46 and through valves 20 and 21 to each of the individual converters. Although valves 20 and 21 are indicated as manually controlled valves, they could be installed in the process as automatically operated valves actuated by temperature control instruments measuring the temperature at the outlet of converters 28 and 44. By controlling the temperature at the converter outlet in this manner, losses of hydrogen sulfide and sulfur dioxide can be held to a minimum yielding an overall sulfur recovery efficiency in the neighborhood of 95 percent during continuous operation.

Feed water is introduced into boiler 4 through valved line 7 and steam in the range of 25 to 100 p.s.i.g. is withdrawn through line 10. Sulfur, which is produced and condensed in the boiler, is withdrawn through line 11. Via line 16 a gaseous mixture containing hydrogen sulfide and sulfur dioxide is taken from boiler 4 at a temperature of approximately 350° F. The amount of sulfur dioxide in this mixture is less than that theoretically possible by oxidation of one-third of the hydrogen sulfide in the feed to the furnace. This hot mixture is blended with air flowing through valve 21 in line 26, and then passes to converter 28. The temperature to be maintained in converter 28 depends on the concentration of hydrogen sulfide in the gas fed thereto. With boiler effluent gases resulting from injection of acid gases containing as little as 10 to 15 percent hydrogen sulfide, the converter catalyst bed temperatures should be about 400° F., while higher converter temperatures in the range of 450° F. may be desired when the acid gas feed is rich, e.g., 60 to 100 percent hydrogen sulfide, because of the higher sulfur dew point. If carbonyl sulfide is present, temperatures as high as about 500° F. may be employed. The quantity of air introduced directly into the converter corresponds to an amount less than that required to form a 2:1 molar ratio of hydrogen sulfide to sulfur dioxide in the reaction mixture in converter 28. The quantity of air to be injected into line 26 as described above, ranges from 2 to about 12 percent of the process air depending on the temperature rise desired. A temperature rise of about 50° F. of the stream in line 26 is usually required to bring the mixture to reaction temperature.

Thus, with the effluent from the boiler in line 26 having the following composition:

| Component | Mols Per 100 Mols H₂S Fed to Process |
|---|---|
| $H_2S$ | 49.3 |
| $SO_2$ | 20.68 |
| $N_2$ | 224.0 |
| $H_2O$ | 50.7 | at a temperature of 350° F., about 2.8 percent air based on the converter feed, would have to be injected through line 21 in order to bring the catalyst in converter 28 to the proper reaction temperature of 450° F. Product gas of the temperature of 600° to 800° F. is withdrawn through line 32 and then introduced into condenser 34 from which liquid sulfur is removed through line 36 at about 300° F. Water at about 230° F. enters the condenser through line 38 and steam at about 280° F. (35 p.s.i.g.) leaves the condenser through line 40. Uncondensed gaseous components are taken from the top of condenser 34 through line 42. This mixture has approximately the following composition:

| Component | Mols Per 100 Mols H₂S Fed to Process |
|---|---|
| $H_2S$ | 18.0 |
| $SO_2$ | 7.0 |
| $N_2$ | 230.5 |
| $H_2O$ | 82.0 |

The temperature of this gas in line 42 is approximately 300° F. To bring the temperature of the catalyst in converter 44 up to 400° F., approximately 2.5 percent air based on the converter feed, should be added through line 46. The resulting product gas is withdrawn from converter 44 at a temperature of about 500° F. through line 48 and sent to condenser 50, operating under the same conditions as condenser 34. Liquid product sulfur is removed through line 52 at about 300° F. with uncondensed and unreacted gases being taken from the system through line 54.

Conditions for supplying the proper heat to converters in accordance with the process of my invention are indicated in the table below. These figures show, particularly, the relationship of boiler effluent gas composition to the quantity of air required to produce a 100° F. temperature rise for initiating oxidation and subsequent reaction between hydrogen sulfide and sulfur dioxide to produce free sulfur.

*Table*

| Gas Composition | Mols/100 mols H₂S Fed | Temperature rise required, °F. | Air required, percent of total Air to Process |
|---|---|---|---|
| $H_2S$ | 54.5 | 350–450 | 3.2 |
| $SO_2$ | 15.5 | | |
| $N_2$ | 194.4 | | |
| $H_2O$ | 45.5 | | |
| $CO_2$ | 567.0 | | |
| $H_2S$ | 20.5 | 300–400 | 3.2 |
| $SO_2$ | 4.5 | | |
| $N_2$ | 216.2 | | |
| $H_2O$ | 79.44 | | |
| $CO_2$ | 567.00 | | |

The amount of hydrogen sulfide converted originally to sulfur dioxide in accordance with my invention may vary from between about 77 to about 98 percent of that required to yield a reaction mixture in which the hydrogen sulfide and sulfur dioxide are present in a ratio of 2:1. Since the total quantity of hydrogen sulfide converted to sulfur dioxide in the overall process amounts to only one-third of the hydrogen sulfide in the original feed, the quantity of hydrogen sulfide in said feed converted to sulfur dioxide in the first step of my invention will be from about 77 to about 98 percent of 33.3 percent. Expressed otherwise, in the first step of my process, from about 25.6 to about 32.5 percent of the hydrogen sulfide in the original feed is converted to sulfur dioxide depending on the richness of the gas with respect to hydrogen sulfide and whether or not a one or two converter plant is used. This then means that the amount of air to be added subsequently to the system in accordance with my invention, in order that one-third of the hydrogen sulfide in the original mixture is converted to sulfur dioxide, will range from about 2 to about 24 percent. With a lean hydrogen sulfide-containing gas (e.g. 10 to 15 percent hydrogen sulfide) the hydrogen sulfide converted to sulfur dioxide in the first step should be from about 25.6 to about 32.3 percent of the hydrogen sulfide in the original feed to produce a reaction mixture the temperature of which can be regulated to the desired degree in subsequent converters by air injection. To this mixture, and prior to the introduction thereof into the first reaction zone, from about 5 to about 12 percent of the total process air is injected into said mixture, whereby the temperature thereof is brought, for example, from 350° to 400° F. After reaction in said zone and separation of the sulfur thus formed, the resulting gas mixture, if it is desired to introduce it into a second reaction zone, is mixed with from about 5 to about 12 percent of the total process air prior to the second reaction step. In this manner the reaction mixture (at a temperature of about 300° F.) may be brought to the desired temperature of about 400° F.

With gases rich in hydrogen sulfide (95 to 100 mol percent) from about 30.0 to about 32.5 percent of the original hydrogen sulfide should be converted to sulfur dioxide in the first step. Thereafter, the mixture thus formed is mixed with from about 2 to 5 percent of the total air charged thereby bringing it from a temperature of from about 350° or 400° F. up to 450° F. prior to introduction into the first converter. If it is desired to employ a second converter to recover additional sulfur from such a gas mixture, the quantity of air used again should likewise be from about 2 to about 5 percent of the total process requirements.

Overall, with a lean gas and a two converter system the total process air added to the system, after initial conversion of less than one-third of the hydrogen sulfide to sulfur dioxide, may range from about 4 to about 24 percent whereas under the same circumstances for a rich gas the added air may range from about 4 to about 10 percent.

As previously indicated, my invention is applicable to processes involving passing all the feed gas through the furnace with a limited amount of air to produce a mixture of hydrogen sulfide or sulfur dioxide, or to methods in which less than one-third of the hydrogen sulfide feed stream is burned to sulfur dioxide and then combined with the remaining two-thirds of the feed. In either of these procedures the application of my invention is identical. Thus, for example, starting with line 26 of the drawing the composition of the gas therein is the same regardless which of the two above procedures is employed to produce said gas. It will likewise be realized that in some instances, for economic or other reasons, only one converter may be justified.

I claim:

1. In a process for the recovery of free sulfur from a gas containing at least 10 to 15 percent hydrogen sulfide by the reaction of a hydrogen sulfide-sulfur dioxide mixture in the presence of a catalyst in a reaction zone at an initial temperature in the range of from about 400° to about 500° F. wherein said mixture is prepared by burning said gas in the presence of sufficient oxygen to convert approximately one-third of said hydrogen sulfide to sulfur dioxide in a combustion zone wherein the temperature of the effluent gas from said combustion zone ranges from about 350° to below 400° F., the method of controlling the reaction temperature in said reaction zone which comprises first oxidizing in said combustion zone from about 25.6 to about 32.5 percent of the hydrogen sulfide in said gas to sulfur dioxide; withdrawing the resulting mixture from said combustion zone, next injecting oxygen into said resulting mixture in an amount ranging from about 2 to about 12 percent of the theoretical oxygen required to give a mixture containing hydrogen sulfide and sulfur dioxide in a molar ratio of about 2:1, and thereafter injecting the mixture thus formed having said ratio into said reaction zone to produce a reaction temperature of from 400° to about 500° F.

2. In a process for the recovery of free sulfur from a gas containing from about 98 to about 100 percent hydrogen sulfide by the reaction of a hydrogen sulfide-sulfur dioxide mixture in the presence of a catalyst in a reaction zone at an initial temperature in the range of from about 400° to about 500° F. wherein said mixture is prepared by burning said gas in the presence of sufficient oxygen to convert approximately one-third of said hydrogen sulfide to sulfur dioxide in a combustion zone wherein the temperature of the effluent gas from said combustion zone ranges from about 350° to below 400° F., the method of controlling the reaction temperature in said reaction zone which comprises first oxidizing in said combustion zone from about 25.6 to about 32.5 percent of the hydrogen sulfide in said gas to sulfur dioxide; withdrawing the resulting mixture from said combustion zone, next injecting oxygen into said resulting mixture in an amount ranging from about 2 to about 5 percent of the theoretical oxygen required to give a mixture containing hydrogen sulfide and sulfur dioxide in a molar ratio of about 2:1, and thereafter injecting the mixture thus formed having said ratio into said reaction zone to produce a reaction temperature of from 400° to about 450° F.

References Cited in the file of this patent

UNITED STATES PATENTS

| | | |
|---|---|---|
| 2,163,554 | Gaither | June 20, 1939 |
| 2,650,154 | Anderson | Aug. 25, 1953 |
| 2,742,347 | Carlson | Apr. 17, 1956 |

FOREIGN PATENTS

| | | |
|---|---|---|
| 689,664 | Great Britain | Apr. 1, 1953 |
| 722,038 | Great Britain | Jan. 19, 1955 |